Dec. 28, 1937. J. A. OBERMAIER 2,103,548
ELECTRIC CONNECTER
Original Filed Oct. 1, 1934
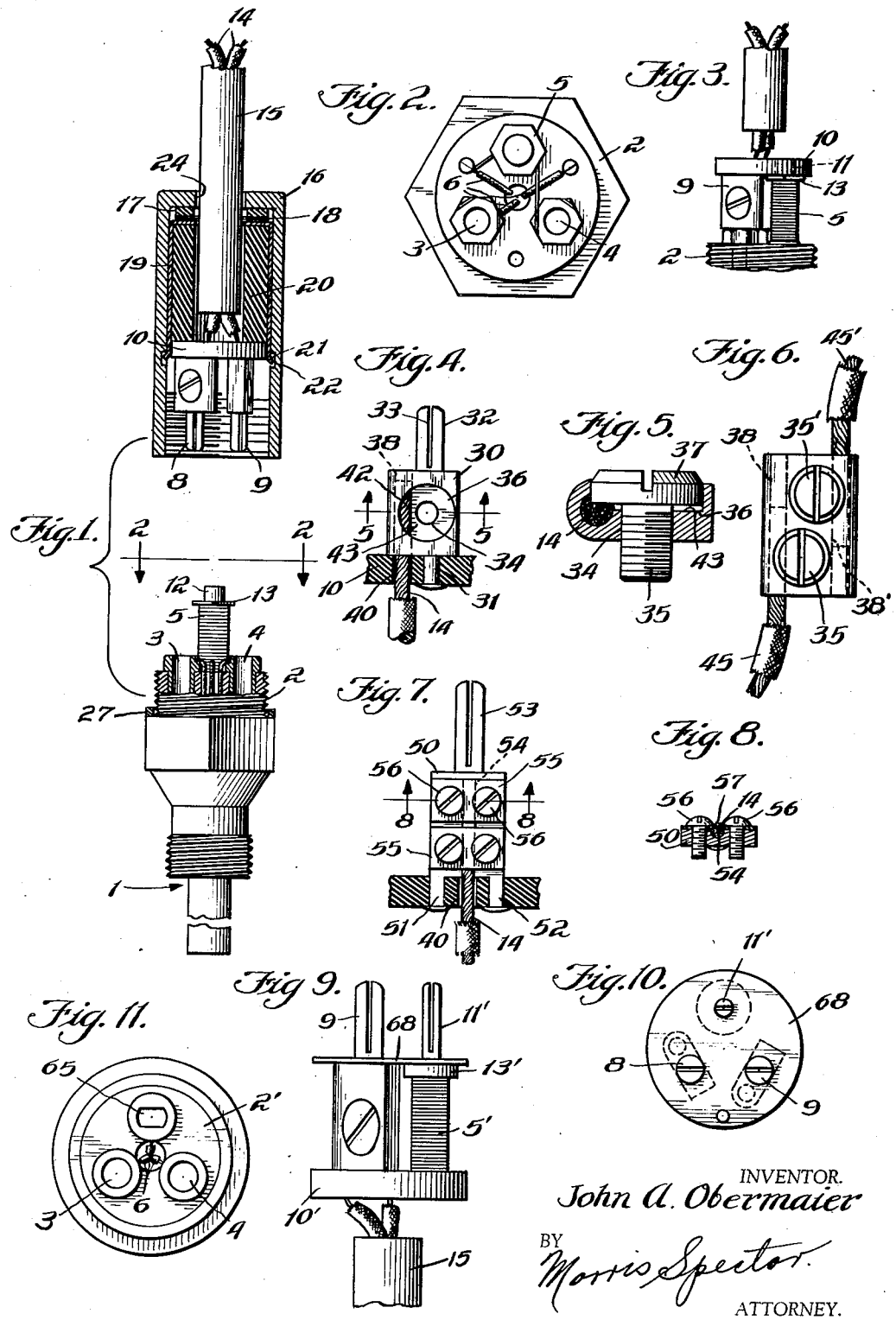
INVENTOR.
John A. Obermaier
BY Morris Spector
ATTORNEY.

Patented Dec. 28, 1937

2,103,548

UNITED STATES PATENT OFFICE 2,103,548

ELECTRIC CONNECTER

John A. Obermaier, Chicago, Ill.

Application October 1, 1934, Serial No. 746,379
Renewed November 5, 1937

3 Claims. (Cl. 173—361)

This invention relates to electric connecters in general, and more particularly to the plug and socket type of connecter, although not limited thereto.

It is one of the objects of the present invention to provide a plug and socket connecter of the two or three prong type which is particularly adapted for use in a circuit for the electrical measurement of temperature. Consider a usual type of electric resistance temperature measuring system. A thermo-resistance element is connected by a plug and socket connecter in a circuit that includes means for measuring its resistance, or change in resistance, which varies as a known function of the temperature. The measuring apparatus may be calibrated to give the temperature directly, or the temperature can be determined indirectly, from the resistance. The measuring apparatus really measures the current that flows through the circuit upon the application of a predetermined potential thereto, the resistance being then taken as a predetermined function of the current. This is true only if there are no extraneous sources of potential in the circuit modifying the current flow. I have discovered that the connection between the thermo-resistance element and the rest of the circuit constitute a possible source for the generation of an extraneous thermo-electric potential which might seriously affect the accuracy of the measurement. It is one of the objects of the present invention to provide a plug and socket type of connecter which will eliminate, or substantially reduce, this source of error. The line conductors extending to the terminals of the connecter are of a different material than the connecter itself, hence a thermo-electric E. M. F. will be set up whenever a temperature difference exists between the terminals. I eliminate, or substantially reduce, the possibilities of the establishment of such temperature difference and thus avoid this source of error. I do this by making the connecter of a minimum outside diameter, thus reducing, as far as possible, the establishment of a temperature difference between different parts of the connecter, and I make the terminals themselves as large as possible, within the small diameter available.

It is a further object of the present invention to provide a terminal for receiving a conductor and firmly clamping the same in place, which is simple and economical in construction and wherein the conductor is firmly wedged in place against becoming loosened by vibration.

It is a further object of the present invention to provide a terminal structure wherein the conductor is wedged in place by a single screw and wherein the conductor serves in the manner of a lock nut to lock the screw against becoming loosened by vibration.

The attainment of the above and further objects of the present invention will be apparent from the following specification taken in conjunction with the accompanying drawing forming a part thereof.

In the drawing:

Figure 1 is a view, in partial longitudinal section, of a resistance thermometer bulb having my improved connecter structure, the cap being separated from the rest of the unit to facilitate illustration;

Figure 2 is a view taken along the line 2—2 of Figure 1;

Figure 3 is a fragmentary view illustrating the plug and socket in their connected position;

Figure 4 is an enlarged view of the male connecter terminal, with the holding screw removed;

Figure 5 is a sectional view taken along the line 5—5 of Figure 4, with the holding screw in position;

Figure 6 shows a modified form of terminal;

Figure 7 shows a modified form of wire holding means in a male connecter terminal;

Figure 8 is a sectional view taken along the line 8—8 of Figure 7;

Figure 9 is a view of a connecter plug with a compensating resistance mounted thereon;

Figure 10 is an end view thereof; and

Figure 11 is a top view of the socket for the plug of Figure 9.

Reference may now be had more particularly to Figures 1 and 2 of the drawing. A resistance thermometer bulb is indicated at 1, terminating in a head or terminal support 2 having a pair of socket terminals 3—4 and a compensating resistor 5. The resistance thermometer bulb is of a construction such as is shown and claimed more particularly in my pending application Serial #741,286, filed August 24, 1934, and, except in combination with the jack structure to be presently described, forms no part of the present invention.

The jack structure comprises a pair of male terminal plugs 8 and 9 that cooperate with the socket terminals 3 and 4. The plugs are riveted on a disc 10 of suitable insulation, such as the material known as "Bakelite". The disc 10 is provided with an opening 11 which receives a projecting portion 12 of the compensating resistor 5. When the plug is fully inserted into the socket, a shoulder 13 on the resistor 5 bears against the disc 10. The circuit to the plugs 8 and 9 is extended by wires 14 of a two wire conductor 15 which extends through a cap 16, a rubber gasket 17, a pair of flat metal washers 18, a metal thimble 19 and a gasket 20 in the form of a piece of rubber tubing. The lower end of the thimble 19 is outwardly flared after insertion into the cap 16, the flared portion 21 extending loosely into a peripheral groove 22 in the cap. This prevents withdrawal of the thimble but allows a limited longitudinal and free rotational movement of the thimble with respect to the cap. The thimble thus retains the gasket 17 and the washers 18 in the correct order as inserted in the factory, while the terminal structure is being connected to the conductor 15 on the job. The conductor 15 is slidable through the tubing 20 so that by pushing downwardly on the conductor 15 the jack structure may be pushed forward to facilitate insertion of the male terminal plugs 8 and 9 into the sockets 3 and 4. Thereafter the cap 16 is slid downwardly and threaded on the threads of the head or terminal support 2. This serves to compress the rubber gasket 17 and the rubber tube 20. Compression of the gasket 17 seals against the entrance of moisture or other impurities, by way of the opening 24 thence by way of the inner surface of the cap 16 and between the cap and the thimble 19 to the connecter. Axial compression of the rubber tube 20 causes it to expand radially into firm engagement with the conductor 15 and thus seal against the entrance of moisture, or other impurities, to the terminal structure by creepage along the surface of the conductor 15. The discs 18 serve as slip friction members between the gasket 17, which rotates with the cap, and the thimble, which does not rotate.

The tube 20 and the thimble 19 do not rotate with respect to the terminal structure as the cap is advanced on the threads of the head 2, since the coefficient of friction between the thimble 19 and the tube 20 is far greater than that between the thimble and the cap 16. The compression on the tube 20 is axial compression and there is no tendency for the tube, in gripping the conductor 15, to twist the same. This is of importance not only while the cap 16 is being tightened on the head 2, but also when it is being backed away from the head 2. When the rubber tubing 20 has been compressed against the conductor 15 for a considerable length of time there is a tendency, under some circumstances, for the rubber tube 20 and the rubberized covering on the conductor 15 to become sweated together as if welded. Any turning force applied to the tube 20 while it is still compressed against the conductor 15 may twist the outer covering of the conductor 15 and cause irreparable injury to the conductor insulation. By my arrangement, whereby all twisting is avoided, the compression between the tubing 20 and the conductor 15 is released before they are moved any appreciable amount with respect to one another. Even then, if the tube 20 and the conductor 15 adhere to one another, they do not have to be separated insofar as concerns the establishment or disestablishment of the electrical connections.

It is to be noted that the opening in the rubber gasket 17 is sufficiently large to prevent engagement of the gasket with the conductor 15 even when the gasket is compressed.

A rubber gasket 27 may, if desired, be provided to help seal the joint between the cap 16 and the head 2 when the cap is threaded on the head.

A description will now be given of the construction of the plug terminal 8 for which reference may be had to Figures 4 and 5. The terminal comprises a metal body portion 30 from which extends an integral stem 31 that forms a rivet for mounting the terminal, and an integral plug portion 32 slitted at 33 to give it resiliency. The body portion 30 has a hole 34 formed therein and tapped and threaded to receive a screw 35, and has an enlarged cylindrical bore 36 for receiving the head 37 of the screw. A conductor receiving hole or groove 38 is formed through the body portion 30 adjacent to but spaced from the hole 34. The bared end of the conductor 14 extends through a hole 40 in the disc 10 in alignment with the hole 38 in the connecter terminal. The hole 38 intersects the enlarged bore 36. The exposed portion of the hole 38 constitutes a groove in which lies a portion of the conductor 14, exposed as indicated at 42, and extending above the surface 43 that constitutes the bottom of the bore 36. As the screw 35 is threaded into the opening 34 the bottom of the head 37 of the screw ultimately engages the portion 42 of the conductor. Further advancement of the screw causes it to compress the conductor and wedge it into high pressure engagement with the terminal. At this time the head of the screw is guided in the bore 36. At the same time, since the conductor presses upwardly against only the left side of the screw head, as seen in Figure 5, and also tends to push the head of the screw to the left, the shank of the screw becomes tightened, the same as if a lock nut or lock washer were used. In effect, the conductor acts somewhat as would a lock washer to lock the screw against becoming loosened by vibration, but more effectively, since the conductor acts on only one side of the screw rather than uniformly around it. The natural elasticity of the conductor metal causes it to resist distortion, and when it is distorted to exert a force tending to restore it to its original shape. This force is exerted against the head of the screw and tends to hold the screw against becoming loosened.

The screw 35 is a right hand screw. Since the conductor enters the opening 38 from the lower left hand side, as seen in Figure 4, tightening of the screw will tend to draw the conductor further into the opening 38, rather than to force it outwardly.

It is to be noted that the body portions 30 of the two plug terminals are close together, thus making the outside diameter of the jack quite small. In addition, the body portions 30 are rather massive, for the space available. By reason of these two factors, I reduce to a minimum the possibility for the establishment of a temperature difference between the two terminals and thus practically eliminate the likelihood of the establishment of thermo-electric E. M. F.'s at the terminal structure.

In Figure 6, I have shown my invention applied to a connecter terminal which is not of the plug and socket type. In this case the connecter is provided with two openings 38 and 38', one for receiving a conductor 45 and the other for receiving a conductor 45'. Each conductor is held by its own screw 35 or 35' in the same manner as is the conductor 14 in the connecter terminal of Figures 4 and 5. It is thus apparent that my invention is not limited to a connecter of the plug and socket type.

In Figures 7 and 8 I have shown still another form of connecter terminal. This terminal consists of a solid block of metal, indicated at 50, from which extend two rivet studs 51—52 formed integrally therewith, and a male contact plug 53 that is also formed integrally therewith and corresponds to the plug 32. On the front face of this terminal there is formed a groove 54 that corresponds to the hole or groove 38. The conductor 14 lies in this groove and extends beyond the surface of the block 50, above, as seen in Figure 8. A pair of spring metal plates 55—55 are laid over the conductor and each secured in place by a pair of screws 56—56. The plates 55 press down upon the conductor and force it into high pressure engagement with the block 50. At the same time the conductor 14 exerts an upward force on the plates, which force is transmitted to the screws 56 more at the centrally innermost part of the screw head than at the outer portion, due to the bulge 57 in the portion of the plate immediately over the conductor. This force tends to lock the screws against becoming loosened by vibration.

In Figures 9, 10 and 11 I have shown a modification of the plug and socket terminal connecter, in that here the compensating resistor is mounted on the plug structure instead of adjacent the sockets 3—4 of the terminal head 2'. In this construction the terminal head is provided with the two sockets 3 and 4, the same as in the structure of Figure 1, and with a third socket 65 in lieu of the compensating resistor 5. The three conductors, indicated at 6, are connected, respectively, to the three sockets. The plug terminal includes two male plugs 8 and 9, as in Figure 1, and a third male plug 11' at the end of a compensating resistance 5'. The compensating resistance 5' is mounted on the disc 10' in any desired manner. One of the conductors 14 is connected directly to the plug 8. The other conductor is connected to the plug 11' in series with the compensating resistance 5. The third plug 9 is a dummy plug and makes contact with a dummy socket 4. During calibration of the line 15 leading to the plug connecter, the conductor that is normally to be connected to the plug 8 is connected to the plug 9, and adjustment of the compensating resistance 5' to compensate for the resistance of the internal leads within the thermoresistance bulb 1 is made as is pointed out more fully in my pending application above referred to. If desired, a fibre or other insulating disc 68 is strung over the plugs 8, 9 and 10, and serves to brace them against inward or outward separation.

It is to be noted that the socket 65 is of a shape specifically different from that of the other two sockets. This serves to polarize the plug and socket assembly and prevent joining of the plug and socket in incorrect relationship of the plugs with the sockets. The two can be brought together only when the plugs 8, 9 and 11' are over the sockets 3, 4 and 65, respectively. Of course, other polarizing arrangements might be used.

In compliance with the requirements of the patent statutes I have shown and described a few preferred embodiments of my invention. It is, however, to be understood that the invention is not limited to the precise structures shown, the same being merely illustrative. What I consider new and desire to secure by Letters Patent is:

1. An electrical connecter comprising a disc of insulation, a block of metal having at one end a riveting stem extending through an opening in the disc and riveted over to secure the block to the disc, the opposite end of the block having a male type connecter prong extending therefrom, said block of metal having a wire receiving groove formed therein and extending in a direction parallel to the prong, the disc of insulation having a wire receiving opening in alignment with the groove, and a wire extending through the opening and secured to the block at the groove therein.

2. An electrical plug connecter comprising a disc of insulation, a block of metal having at one end a riveting stem extending through an opening in the disc and riveted over to secure the block to the disc, the opposite end of the block having a male type connecter prong extending therefrom, said block of metal having a wire receiving groove formed therein and extending in a direction parallel to the prong, at least a portion of the groove being exposed, a conductor extended through the disc and lying in the groove and of a diameter greater than the depth of the groove at the exposed part, whereby the conductor extends above the edges of the groove at least at the portion of the groove that is exposed, and means extending over the conductor at the exposed portion of the groove and clamping the conductor firmly in the groove, said means including at least one screw-threaded member threaded into the block of metal and effecting the clamping action.

3. An electrical connecter comprising a disc of insulation, a block of metal having at one end a riveting stem extending through an opening in the disc and riveted over to secure the block to the disc, the opposite end of the block having a portion shaped to constitute one terminal of a plug and socket connecter, said block of metal having a wire receiving groove formed therein and extending in a direction parallel to the riveting stem, the disc of insulation having a wire receiving opening in alignment with the groove, and a wire extending through the opening and secured to the block at the groove therein.

JOHN A. OBERMAIER.